(12) United States Patent
Lee et al.

(10) Patent No.: US 11,238,288 B2
(45) Date of Patent: Feb. 1, 2022

(54) METHOD AND APPARATUS FOR EXTRACTING HIGHLIGHT OF SPORTING EVENT

(71) Applicant: NCSOFT Corporation, Seoul (KR)

(72) Inventors: Young Hyun Lee, Seongnam-si (KR); Hyun Jo Jung, Seongnam-si (KR)

(73) Assignee: NCSOFT Corporation, Seoul (KR)

( * ) Notice: Subject to any disclaimer, the term of this patent is extended or adjusted under 35 U.S.C. 154(b) by 0 days.

(21) Appl. No.: 16/536,411

(22) Filed: Aug. 9, 2019

(65) Prior Publication Data

US 2020/0110941 A1  Apr. 9, 2020

(30) Foreign Application Priority Data

Oct. 4, 2018 (KR) .......................... 10-2018-0118147

(51) Int. Cl.
| | | |
|---|---|---|
| *G06K 9/00* | (2006.01) | |
| *G11B 27/34* | (2006.01) | |
| *G11B 27/031* | (2006.01) | |
| *G11B 27/22* | (2006.01) | |

(52) U.S. Cl.
CPC ..... *G06K 9/00751* (2013.01); *G06K 9/00724* (2013.01); *G11B 27/031* (2013.01); *G11B 27/22* (2013.01); *G11B 27/34* (2013.01)

(58) Field of Classification Search
CPC .......................... G06K 9/00751; G11B 27/031
See application file for complete search history.

(56) References Cited

U.S. PATENT DOCUMENTS

| | | | |
|---|---|---|---|
| 2003/0182620 A1 | 9/2003 | Errico et al. | |
| 2008/0175486 A1* | 7/2008 | Yamamoto | G06F 16/7844 382/206 |
| 2017/0025152 A1* | 1/2017 | Jaime | H04N 21/4223 |
| 2019/0180109 A1* | 6/2019 | Sinha | H04N 21/8549 |

FOREIGN PATENT DOCUMENTS

| | | |
|---|---|---|
| JP | 2008-176538 A | 7/2008 |
| JP | 2017-168057 A | 9/2017 |
| KR | 10-0721409 B2 | 5/2007 |

(Continued)

OTHER PUBLICATIONS

Kim et al. "Indexing of Player Events Using Multimodal Cues in Golf Videos", IEEE, 2011, 6 pages.
(Continued)

*Primary Examiner* — Girumsew Wendmagegn
(74) *Attorney, Agent, or Firm* — Sughrue Mion, PLLC

(57) ABSTRACT

A method for highlight extraction capable of automatically extracting a highlight from a video including a sporting event is provided. The method for highlight extraction may include: identifying a video including a sporting event, log information that sequentially records events occurring in the sporting event, and a keyword related to the video; tagging the video with game information related to the video; extracting at least one piece of log information corresponding to the keyword and determining at least one frame that corresponds to the log information extracted from the tagged video; and creating a highlight video by combining the at least one determined frame.

18 Claims, 11 Drawing Sheets

(56) References Cited

FOREIGN PATENT DOCUMENTS

KR    10-2009-0019582 A    2/2009

OTHER PUBLICATIONS

Communication dated Feb. 12, 2020 by the European Patent Office in Application No. 19194238.2.
Communication dated Nov. 11, 2019, issued by the Korean Intellectual Property Office in application No. 10-2018-0118147.
Communication dated May 28, 2020 issued by the Korean Intellectual Property Office in Korean Application No. 10-2018-0118147.
Office Action dated Jun. 29, 2021 in Japanese Application No. 2019-147008.

* cited by examiner

FIG. 3
SCOREBOARD IS PRESENT
NO SCOREBOARD IS PRESENT

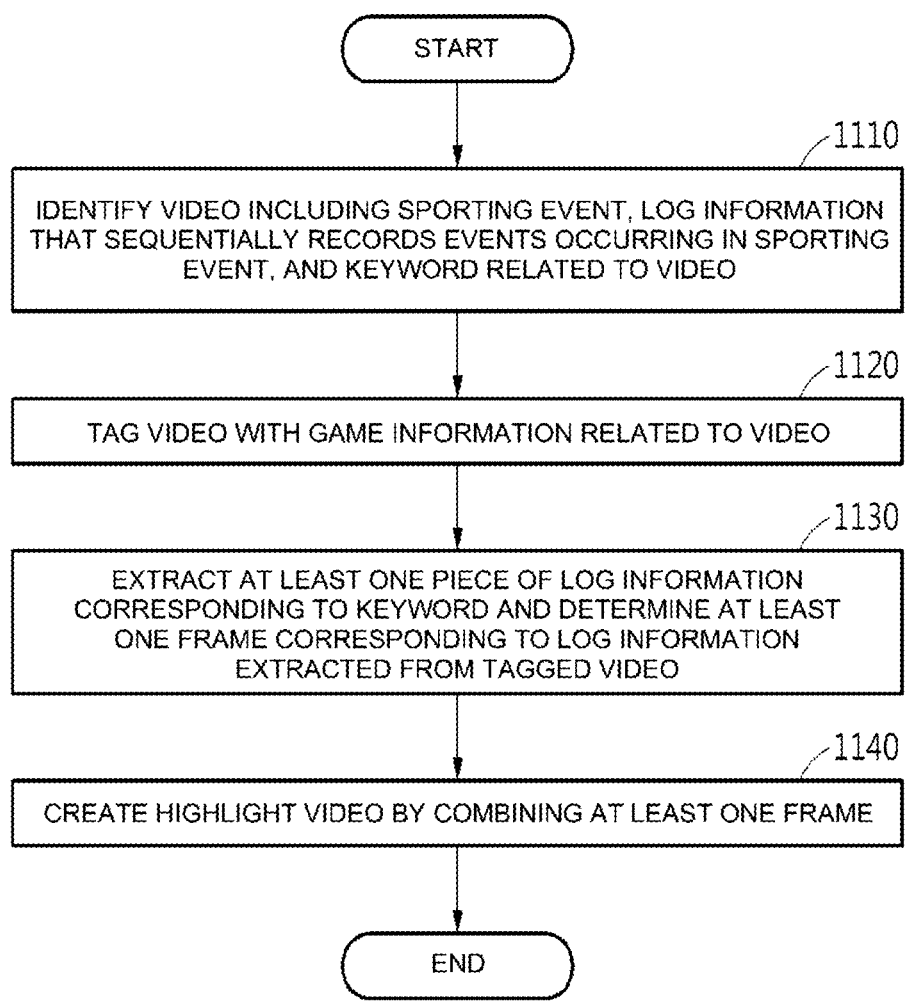

METHOD AND APPARATUS FOR EXTRACTING HIGHLIGHT OF SPORTING EVENT

CROSS-REFERENCE TO RELATED APPLICATION(S)

This application claims the benefit under 35 USC § 119(a) of Korean Patent Application No. 10-2018-0118147, filed on Oct. 4, 2018, in the Korean Intellectual Property Office, the entire disclosure of which is incorporated herein by reference for all purposes.

BACKGROUND

1. Field

The following description relates to a method and apparatus for extracting a highlight of a sporting event.

2. Description of Related Art

A user or an expert may create a highlight video of a sporting event by designating a split start point and a split end point of frame while directly watching a video. Such a manual operation may take time and cost to create highlight video from a large amount of videos. Thus, there is a need for a method of highlight extraction which allows for automatically, rather than manually, creating a highlight video of a sporting event.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In one general aspect, a method for highlight extraction includes identifying a video including a sporting event, log information that sequentially records events occurring in the sporting event, and a keyword related to the video; tagging the video with game information related to the video; extracting at least one piece of log information corresponding to the keyword and determining at least one frame that corresponds to the log information extracted from the tagged video; and creating a highlight video by combining the at least one determined frame.

The creating of the highlight video may include, when there is a single keyword, creating one highlight video corresponding to the single keyword, and when there are a plurality of keywords, creating the highlight video by combining at least one highlight video corresponding to the plurality of keywords.

The tagging of the video may include, when a scoreboard is displayed in the video, recognizing game information shown in the scoreboard and tagging the game information to a corresponding frame of the video, and when a scoreboard is not displayed in the video, tagging a corresponding frame of the video with information indicating that there is no game information that corresponds to the scoreboard, and the game information shown in the scoreboard includes score, ball count, and inning.

The method may further include extracting a characteristic from the scoreboard displayed in a predetermined area of the video and classifying the extracted characteristic using data learned in advance.

When the game information shown in the scoreboard further includes runner status, the runner status may be tagged to a corresponding frame of the video and when the game information shown in the scoreboard further includes a pitch count, the pitch count may be tagged to a corresponding frame of the video.

The tagging of the video may include tagging scene change information to a corresponding frame of the video by detecting scene change, and tagging scene recognition information to a corresponding frame of the video by performing scene recognition according to predetermined criteria.

The scene change may be detected by converting red-green-blue (RGB) into hue-saturation-value (HSV) and using a histogram difference of the HSV, wherein the histogram difference between a previous frame and a current frame for each channel of each of the HSV is determined and the scene change is determined by comparing the determined histogram difference with a predetermined reference.

The scene recognition may be set on the basis of a criterion matching a corresponding frame among predetermined criteria set by an apparatus for highlight extraction.

The at least one frame may include a frame from a starting frame of a target pitch count—1 to a last frame of the target pitch count that correspond to a situation included in the keyword.

The method may further include ruling out a frame that does not correspond to the keyword from frames from a starting frame of the target pitch count—1 to a last frame of the target pitch count.

In another general aspect, an apparatus for highlight extraction includes a processor and a memory including a computer-readable command, wherein the processor is configured to, when the command is executed in the processor, identify a video including a sporting event, log information that sequentially records events occurring in the sporting event, and a keyword related to the video, tag the video with game information related to the video, extract at least one piece of log information corresponding to the keyword and determine at least one frame that corresponds to the log information extracted from the tagged video, and create a highlight video by combining the at least one determined frame.

When there is a single keyword, the processor may create one highlight video corresponding to the single keyword, and, when there are a plurality of keywords, the processor may create the highlight video by combining at least one highlight video corresponding to the plurality of keywords.

When a scoreboard is displayed in the video, the processor may recognize game information shown in the scoreboard and tag the game information to a corresponding frame of the video, and, when a scoreboard is not displayed in the video, the processor may tag a corresponding frame of the video with information indicating that there is no game information that corresponds to the scoreboard, and the game information shown in the scoreboard includes score, ball count, and inning.

The processor may extract a characteristic from the scoreboard displayed in a predetermined area of the video and classify the extracted characteristic using data learned in advance.

When the game information shown in the scoreboard further includes runner status, the processor may tag the runner status to a corresponding frame of the video, and, when the game information shown in the scoreboard further includes a pitch count, the processor may tag the pitch count to a corresponding frame of the video.

The processor may tag scene change information to a corresponding frame of the video by detecting scene change and tag scene recognition information to a corresponding frame of the video by performing scene recognition according to predetermined criteria.

The processor may detect the scene change by converting RGB into HSV and using a histogram difference of the HSV, wherein the histogram difference between a previous frame and a current frame for each channel of each of the HSV is determined and the scene change is determined by comparing the determined histogram difference with a predetermined reference.

The scene recognition may be set on the basis of a criterion matching a corresponding frame among predetermined criteria set by the apparatus for highlight extraction.

The at least one frame may include a frame from a starting frame of a target pitch count—1 to a last frame of the target pitch count that correspond to a situation included in the keyword.

The processor may rule out a frame that does not correspond to the keyword from frames from a starting frame of the target pitch count—1 to a last frame of the target pitch count.

Other features and aspects will be apparent from the following detailed description, the drawings, and the claims.

BRIEF DESCRIPTION OF THE DRAWINGS

FIG. 3 shows examples of an image of a video that displays a scoreboard and an image of a video that does not display a scoreboard.

FIG. 11 is a flowchart illustrating a method for highlight extraction performed by an apparatus for highlight extraction according to one embodiment.

Figure 1:
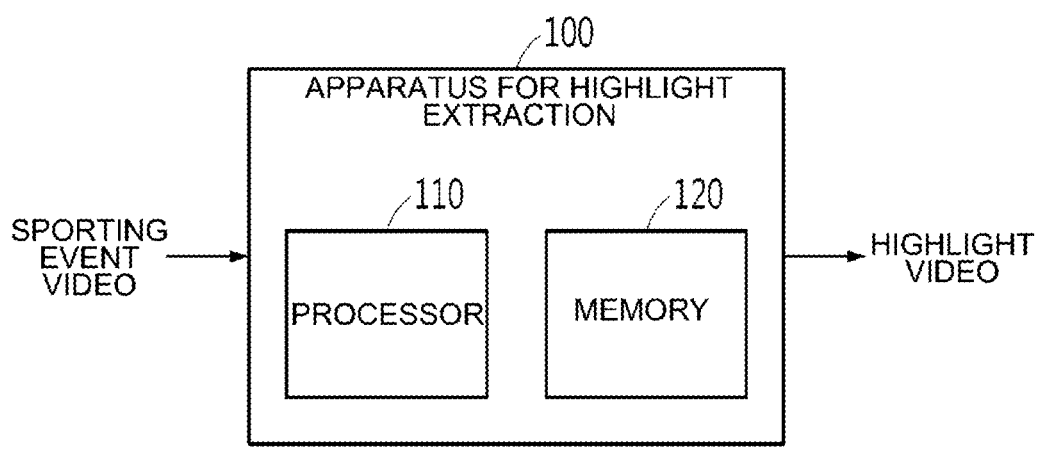
FIG. 1 is a diagram illustrating an apparatus for highlight extraction.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments of the inventive concepts. As used herein, the singular forms "a," "an," and "the" are intended to include the plural forms as well, unless the context clearly indicates otherwise. It will be further understood that the terms "comprises," "comprising," "includes," and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art.

Hereinafter, exemplary embodiments will be described in detail with reference to the accompanying drawings.

FIG. 1 is a diagram illustrating an apparatus for highlight extraction.

The apparatus 100 for highlight extraction may receive a video including a sporting event. The apparatus 100 for highlight extraction may receive the video including a sporting event from a broadcasting station, or may identify the video through a separate storage device. The apparatus 100 for highlight extraction may create a highlight video that matches specific conditions from the received video including a sporting event. Thus, the highlight video for the video including a sporting event may not be passively created, but may be automatically created through the apparatus 100 for highlight extraction.

Specifically, the apparatus 100 for highlight extraction may identify log information that sequentially records events occurring in the sporting event. For example, the log information may be information, such as text broadcasting, which sequentially records events occurring in a baseball game and may be information recorded according to an order in which the events occur.

In addition, the apparatus 100 for highlight extraction may identify a keyword related to the video. In this case, the keyword may be manually input by a user or be generated by a separate keyword generation module. For example, the user may input "Sung-Bum Na's 30th home-run" as keywords, or a separate keyword generation module may analyze articles published on various portal sites after a baseball game and generate "Sung-Bum Na's 30th home-run" as keywords of the corresponding baseball game.

In this case, the video including a sporting event and the log information may be searched based on the keywords. For example, when "Sung-Bum Na's $30^{th}$ home-run" is input as keywords, the apparatus 100 for highlight extraction may search for a video including the Sung-Bum Na's $30^{th}$ home-run and log information related to the video and create a highlight video.

The apparatus 100 for highlight extraction may tag the video with game information related to the video. Tagging the video with the game information will be described in detail with reference to FIG. 2.

The apparatus 100 for highlight extraction may extract at least one piece of log information that corresponds to a keyword and determine at least one frame that corresponds to the log information extracted from the tagged video. In this case, the apparatus 100 for highlight extraction may create a highlight video by combining at least one frame.

When it is not possible to extract at least one piece of log information corresponding to the keyword from the video including a sporting event, a highlight video corresponding to the keyword cannot be created from the video including the corresponding sporting event. For example, in a case where "Home-run" is input as a keyword, when there is no home-run in a baseball game, a highlight video corresponding to a home-run cannot be created for the corresponding baseball game.

According to one embodiment, the apparatus 100 for highlight extraction may create a highlight video corresponding to a key moment from the sporting event. Alternatively, the apparatus 100 for highlight extraction may generate a summary image that summarizes the corresponding sporting event by combining a plurality of highlight videos. Hereinafter, a method of highlight extraction of a baseball game, which is taken as an example of a sporting event, will be described. However, the baseball game is merely an example of a sporting event, and the sporting event is not limited to a baseball game.

Figure 2:
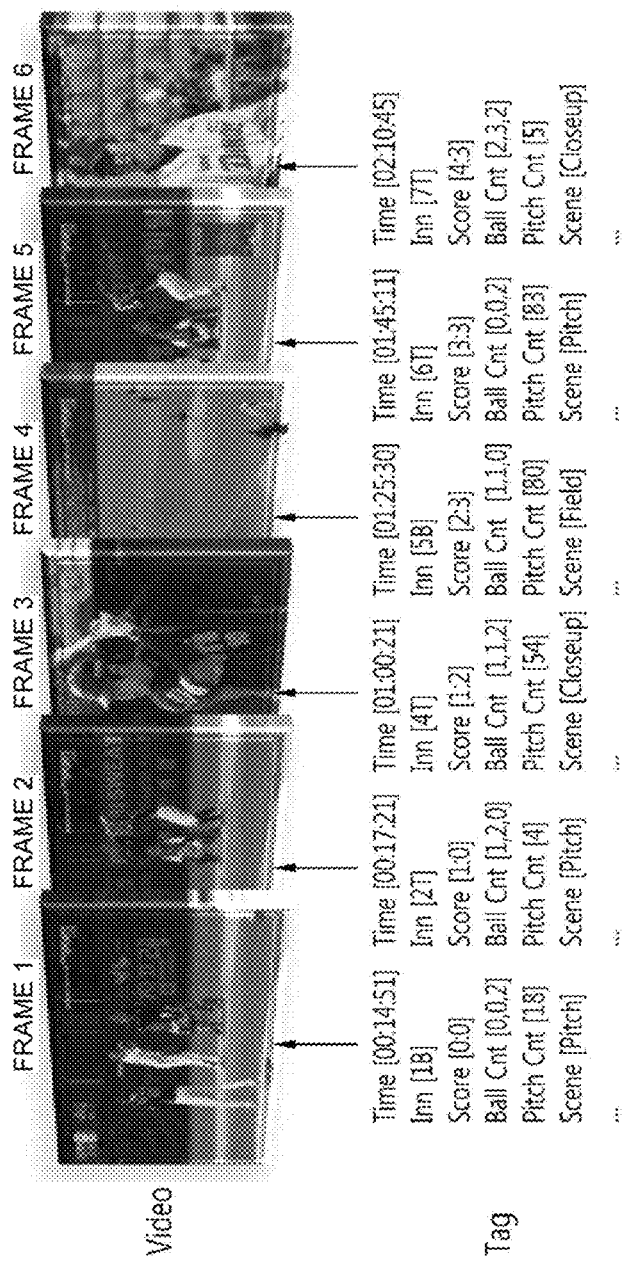
FIG. 2 is a diagram illustrating a state in which a video is tagged with game information according to one embodiment.

FIG. 2 is a diagram illustrating a state in which a video is tagged with game information according to one embodiment.

An apparatus for highlight extraction may identify a video including a baseball game, composed of a plurality of frames. The apparatus for highlight extraction may receive a video from a broadcasting station in real time, or may identify the video through a separate storage device.

The apparatus for highlight extraction may tag game information and scene information to a frame of interest. For example, frame 1 may be tagged with game information and scene information including a score of 0:0 at the bottom of the $1^{st}$ inning, 2 outs, a pitch count of 18 pitches, and pitch. In another example, frame 2 may be tagged with game information and scene information including a score of 1:0 at the top of the $2^{nd}$ inning, 1 ball-2 strikes, a pitch count of 4 pitches, and pitch.

Here, the game information may be identified through, for example, a scoreboard. A baseball game video may or may not include a scoreboard. FIG. 3 shows examples of an image of a video that displays a scoreboard and an image of a video that does not display a scoreboard. The scoreboard may be displayed on a predetermined area of the video. The scoreboard may include information on a corresponding baseball game. For example, the scoreboard may include game information for a frame of interest, such as inning, score, ball count, runner status, and pitch count.

According to one embodiment, in the case of a frame displaying a scoreboard, the apparatus for highlight extraction may tag game information (e.g., inning, score, ball count, runner status, pitch count, and the like) identified through the scoreboard to the corresponding frame. According to another embodiment, in the case of a frame displaying no scoreboard, the apparatus for highlight extraction may tag information indicating that there is no scoreboard to the corresponding frame.

Figure 4:
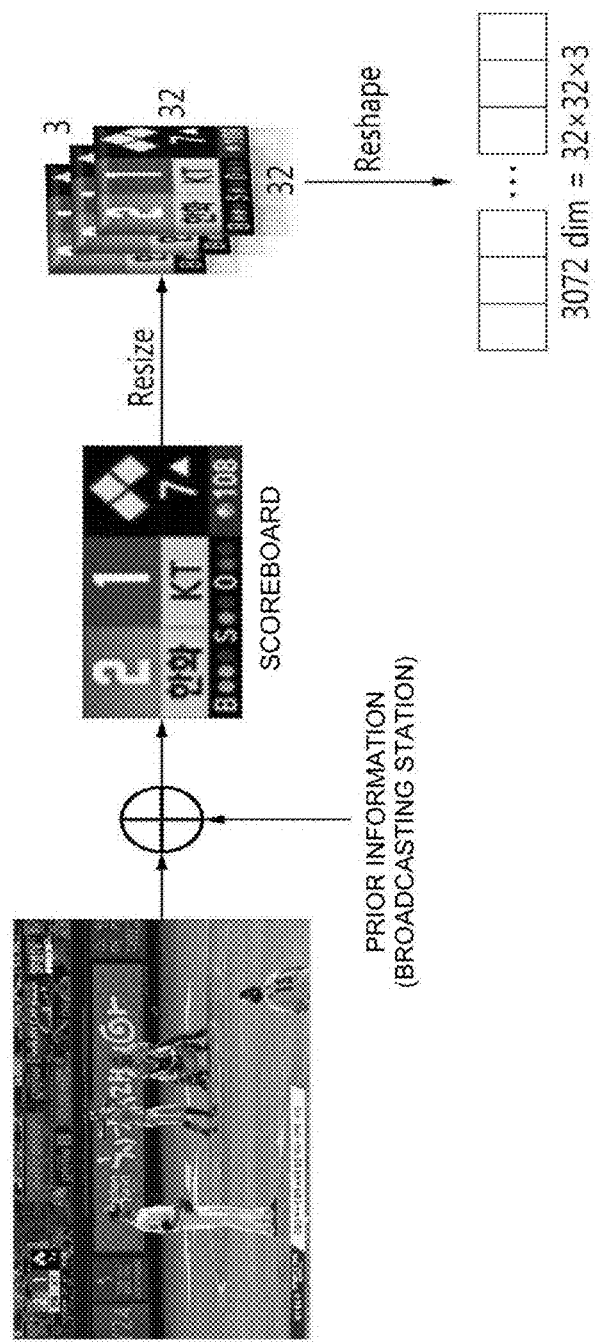
FIG. 4 is a diagram illustrating a procedure in which an apparatus for highlight extraction learns a scoreboard by applying a support vector machine (SVM).

FIG. 4 is a diagram illustrating a procedure in which an apparatus for highlight extraction learns a scoreboard by applying a support vector machine (SVM).

A scoreboard displayed in a video may be displayed at a fixed position and may not be changed in its position during a game. Thus, the apparatus for highlight extraction may extract a characteristic of the scoreboard displayed in a specific area of the video.

According to one embodiment, the apparatus for highlight extraction may recognize a pattern of the extracted characteristic using a SVM. Specifically, scoreboards displayed in videos broadcast by different broadcasting stations may differ from each other. For example, even when scoreboard 1 displayed in a video broadcast by broadcasting station 1 includes the same information (e.g., inning, score, ball count, runner status, pitch count, and the like) as that displayed in scoreboard 2 displayed in a video broadcast by broadcasting station 2, positions of each information may be different in each scoreboard.

According to one embodiment, the apparatus for highlight extraction may learn the scoreboard of each broadcasting station in advance and extract a characteristic from the scoreboard that corresponds to a current frame. Thus, the apparatus for highlight extraction may recognize the characteristic extracted by applying the SVM and extract information, such as inning, score, ball count, runner status, pitch count, and the like. Even when the scoreboard of the broadcasting station is changed, the apparatus for highlight extraction may extract information by learning the changed scoreboard.

Figure 5:
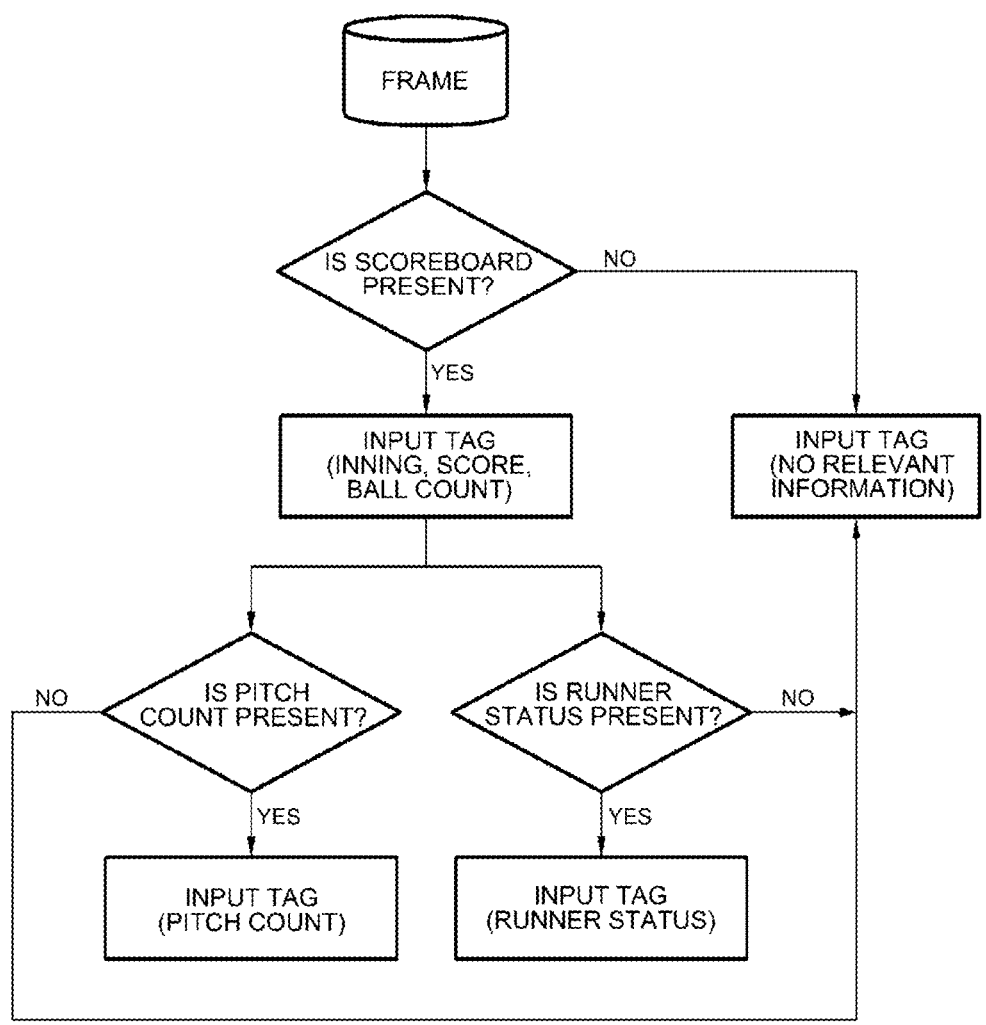
FIG. 5 is a diagram illustrating a procedure in which an apparatus for highlight extraction recognizes a scoreboard and tags game information according to one embodiment.

FIG. 5 is a diagram illustrating a procedure in which an apparatus for highlight extraction recognizes a scoreboard and tags game information according to one embodiment.

The apparatus highlight extraction may determine whether or not a scoreboard is displayed in a current frame of a video. The apparatus for highlight extraction may learn the scoreboard of each broadcasting station in advance through the procedure of FIG. 4.

In this case, when the scoreboard is not displayed in the current frame, the apparatus for highlight extraction cannot extract information from the scoreboard and accordingly may tag the current frame with information indicating that there is no game information. When the scoreboard is displayed in the current frame, the apparatus for highlight extraction may extract information from the scoreboard and tag the current frame with game information. In this case, the game information to be input may include inning, score, and ball count.

When the scoreboard further includes game information related to runner status, the apparatus for highlight extraction may extract the runner status and tag the runner status to the current frame. When the scoreboard does not include the game information related to the runner status, the apparatus for highlight extraction may tag information indicating there is not runner status.

When the scoreboard further includes game information related to pitch count, the apparatus for highlight extraction may extract the pitch count and tag the pitch count to the current frame. When the scoreboard does not include the game information related to the pitch count, the apparatus for highlight extraction may tag information indicating that there is no pitch count.

Figure 6:
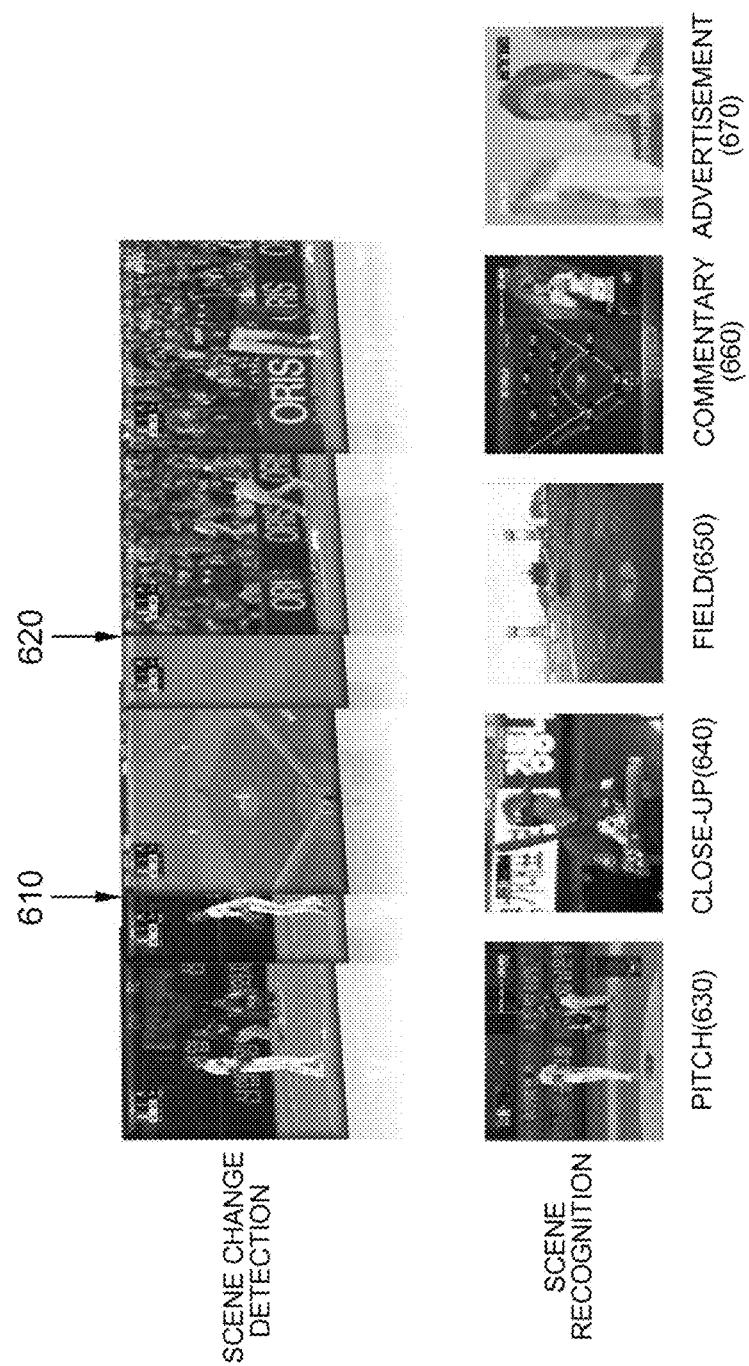
FIG. 6 is a diagram illustrating a state in which an apparatus for highlight extraction detects a scene change from a frame and recognizes a scene of the corresponding frame.

FIG. 6 is a diagram illustrating a state in which an apparatus for highlight extraction detects a scene change from a frame and recognizes a scene of the corresponding frame.

According to one embodiment, the apparatus for highlight extraction may recognize scene information as well as game information and tag the recognized information to a corresponding frame. In this case, the scene information may include whether scene change occurs and scene recognition.

Scene change detection indicates that a scene of a baseball game displayed has changed. For example, a frame before a frame denoted by reference numeral 610 shows a scene related to a pitcher, a frame between the frame denoted by reference numeral 610 and a frame denoted by reference numeral 620 shows a scene related to a runner's stealing, and a frame after the frame denoted by reference numeral 620 shows a scene showing the runner. Thus, the apparatus for highlight extraction may detect that a scene has changed between the frames denoted by reference numerals 610 and 620. That is, the apparatus for highlight extraction may detect from successive frames whether a scene changes and may tag a corresponding frame with information on whether or not the scene change is detected. The scene change detection will be described in detail with reference to FIG. 7.

The apparatus for highlight extraction may distinguish scenes of a baseball game video according to predetermined criteria. In this case, scene recognition indicates recognition of a reference that matches a current frame. Specifically, the apparatus for highlight extraction may set the predetermined criteria, such as pitch, zoom-in of pitching, close-up, field (batted ball tracking), advertisement, commentary, stand, dugout, game sketch, ball park view, and dual screen (PIP), and recognize which criterion a frame of interest corresponds to. For example, the apparatus for highlight extraction may recognize an image 630 as a scene that corresponds to pitch and an image 640 as a scene that corresponds to close-up. In addition, the apparatus for highlight extraction may recognize an image 650 as a scene that corresponds to a field and an image 660 as a scene that corresponds to a commentary. And, the apparatus for highlight extraction may recognize an image 670 as a scene that corresponds to an advertisement. Thus, the apparatus for highlight extraction may recognize a scene of a frame of interest and tag the recognized information to the frame. The scene recognition will be described in detail with reference to FIG. 8.

Figure 7:
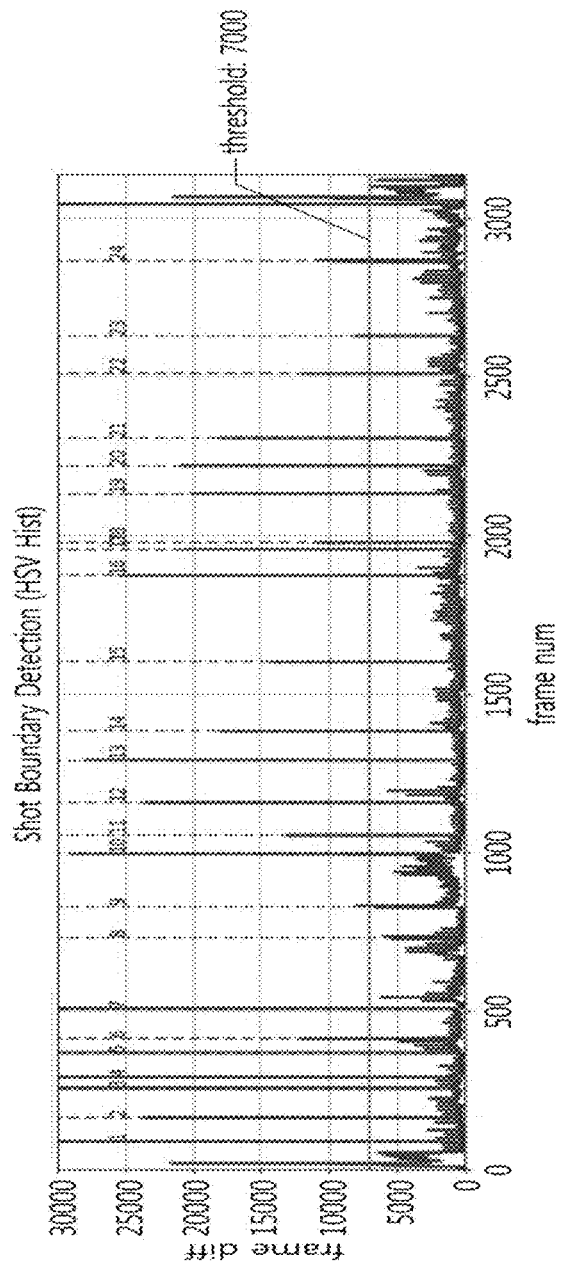
FIG. 7 is a graph of scene change detection according to one embodiment.

FIG. 7 is a graph of scene change detection according to one embodiment.

An apparatus for highlight extraction may convert color from red-green-blue (RGB) into hue-saturation-value (HSV). The apparatus for highlight may perform HSV pixel quantization on the converted HSV. For example, the apparatus for highlight extraction may perform HSV pixel quantization on 24 bits into 10 bits. Here, the 10-bit is merely an example and indicates bits of a frame of interest corresponding to the amount at which scene change can be detected.

The apparatus for highlight extraction may determine a histogram difference between a previous frame and a current frame for each channel of each HSV. In this case, the apparatus for highlight extraction may determine an average of the histogram differences with respect to all bins (one period of a histogram). Here, the apparatus for highlight extraction may detect whether scene change has occurred by comparing the average of the histogram differences with a predetermined reference. Specifically, when the average of the histogram differences is higher than a threshold (e.g., 7000) that is the predetermined reference, it indicates that the scene has changed between the current frame and the previous frame. Alternatively, when the average of the histogram differences is lower than the threshold, it indicates that there is no scene change between the current frame and the previous frame. For example, in the frame before the frame denoted by reference numeral 610, the average of the histogram differences is lower than the threshold. In another example, in frames before and after the frame denoted by reference numeral 610, the average of the histogram differences is higher than the threshold.

Figure 8:
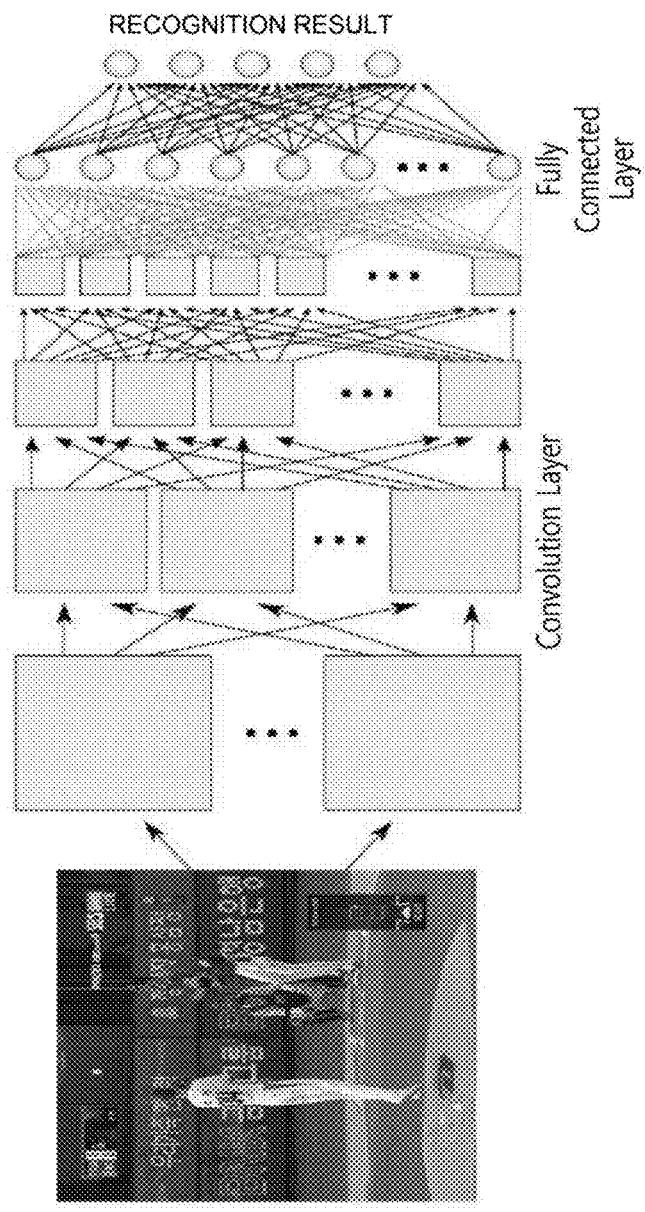
FIG. 8 is a diagram for describing scene recognition based on deep learning according to one embodiment.

FIG. 8 is a diagram for describing scene recognition based on deep learning according to one embodiment.

An apparatus for highlight extraction may recognize a type of an output image of a video including a sporting event by applying deep learning with ResNet v2 architecture as an example of deep learning. Specifically, the apparatus for highlight extraction may classify types of output images of a video according to specific criteria and recognize which criterion a displayed image corresponds to. In this case, the specific criteria may differ from one sporting event to another. For example, in the case of a baseball game, the apparatus for highlight extraction may preset the specific criteria, such as pitch, zoom-in of pitching, close-up, field (batted ball tracking), advertisement, commentary, stand, dugout, game sketch, ball park view, and dual screen (PIP).

The apparatus for highlight extraction may recognize a scene of a frame of interest on the basis of the most matching criterion among the specific criteria by applying deep learning with ResNet v2 architecture to the frame of interest. In this case, the apparatus for highlight extraction may use a recognizer score for each frame and recognize the corresponding frame on the basis of the highest score.

Figure 9:
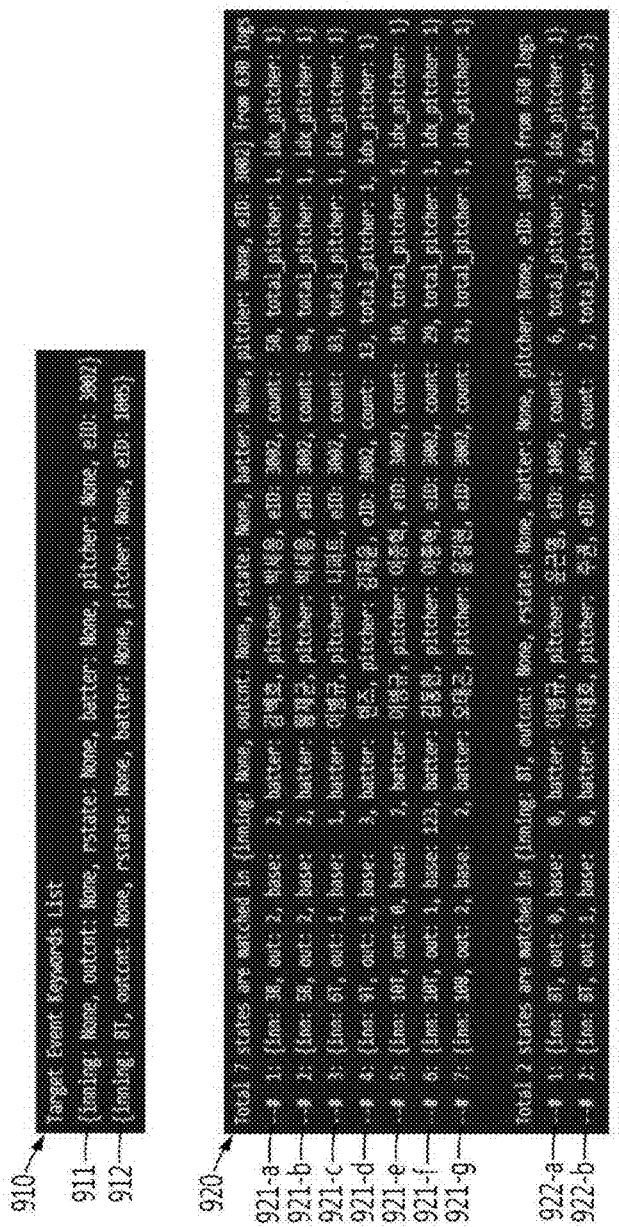
FIG. 9 is a diagram illustrating a procedure for extracting log information corresponding to a keyword according to one embodiment.

FIG. 9 is a diagram illustrating a procedure for extracting log information corresponding to a keyword according to one embodiment.

An apparatus for highlight extraction may identify a keyword. In the case of a baseball game as an example of a sporting event, the keyword may include inning, outs, runner status, batter, pitcher, event (home-run and the like), and so on. The keyword may be input by a user, or may be automatically generated by a separate keyword generation module.

The apparatus for highlight extraction may search for log information that corresponds to the keyword. A diagram denoted by reference numeral 910 shows keywords and a diagram denoted by reference numeral 920 shows searched log information that corresponds to the keywords. In this case, the apparatus for highlight extraction may extract log information that corresponds to information included in the keyword, and may not take into account information that is not included in the keyword.

For example, as log information associated with keywords 911 for eID 3002, seven pieces of log information 921-*a*, 921-*b*, 921-*c*, 921-*d*, 921-*e*, 921-*f*, and 921-*g* may be searched from among a plurality of pieces of log information (e.g., 630 pieces). The seven pieces of log information 921 searched are log information including eID 3002 from among the total of 630 pieces log information generated during one game. In this case, eID 3002 is an example, which may indicate an event occurring during the sporting event, such as a home-run, a scoring situation, and the like.

Specifically, the log information 921-*a* may correspond to an event of eID 3002 occurring at pitcher Se-Woong Park's $50^{th}$ pitch against batter Baek-Ho Kang in a situation where there is a runner on second base with two outs at the bottom of the $3^{rd}$ inning. The log information 921-*b* may correspond to an event of eID 3002 occurring at pitcher Se-Woong Park's $94^{th}$ pitch against batter Jae-Gyun Hwang in a situation where there is a runner on second base with two outs at the bottom of the $5^{th}$ inning. The log information 921-*g* may correspond to an event of eID 3002 occurring at pitcher Kil-Hyeon Yoon's $21^{st}$ pitch against batter Tae-gon Oh in a situation where there is a runner on second base with two outs at the bottom of the $10^{th}$ inning.

In another example, as log information associated with keywords 912 for top of the $8^{th}$ inning and eID 1005, two pieces of log information 922-*a* and 922-*b* may be searched from among a plurality of pieces of log information (e.g., 630 pieces). The two pieces of log information 922 searched are log information including top of the $8^{th}$ inning and eID 1005 from among the total of 630 pieces of log information generated during one game. In this case, eID 1005 is an example, which may indicate an event occurring during a sporting event, such as strikeout.

Specifically, the log information 922-*a* may correspond to an event of eID 1005 occurring in a situation where there are two pitchers each throwing 6 pitches, the first pitcher is Keun-Young Yoon, a batter is Byeong-Gyu Lee and there is no runner with no out at the top of the $8^{th}$ inning. The log information 922-*b* may correspond to an event of eID 1005 occurring in a situation where two pitchers each throw 2 pitches at the top of the $8^{th}$ inning, the second pitcher is Kwon Joo, a batter is Dae-Ho Lee and there is no runner, with one out.

According to one embodiment, the apparatus for highlight extraction may determine at least one frame corresponding to the searched log information. In this case, the apparatus for highlight extraction may determine whether the frame corresponds to the log information using the game information tagged to the frame. Specifically, the apparatus for highlight extraction may determine whether the frame corresponds to the log information by matching with the searched log information using game information identified on the basis of a scoreboard.

In this case, the apparatus for highlight extraction may determine at least one frame for creating a highlight video on the basis of the target pitch count corresponding to the searched log information. At least one frame for creating the highlight video may include any frames from the starting frame of the target pitch count—1 to the last frame of the target pitch count.

Specifically, when log information is searched based on keywords "Sung-Bum Na's $30^{th}$ home-run," the log information may include a target pitch count and a pitcher corresponding to Sung-Bum Na's $30^{th}$ home-run. The apparatus for highlight extraction may extract frames from the starting frame of the target pitch count—1 to the last frame of the target pitch count and create a highlight video corresponding to Sung-Bum Na's $30^{th}$ home-run by combining the extracted frames. When there are a number of pitchers reaching the same target pitch count in the same inning, the target pitch count may be determined using a pitcher's name or the pitching turn of a corresponding pitcher.

For example, when Sung-Bum Na hits his $30^{th}$ home-run against the first pitcher among pitchers throwing 50 pitches at the top of the $8^{th}$ inning, the apparatus for highlight extraction may identify log information that corresponds to Sung-Bum Na's $30^{th}$ home-run, which is the keyword. The apparatus for highlight extraction may determine frames corresponding to Sung-Bum Na's $30^{th}$ home-run using the target pitch count of 50 pitches and information on the first pitcher which are included in the log information, and may create a highlight video corresponding to Sung-Bum Na's $30^{th}$ home-run by combining the relevant frames.

Figure 10:
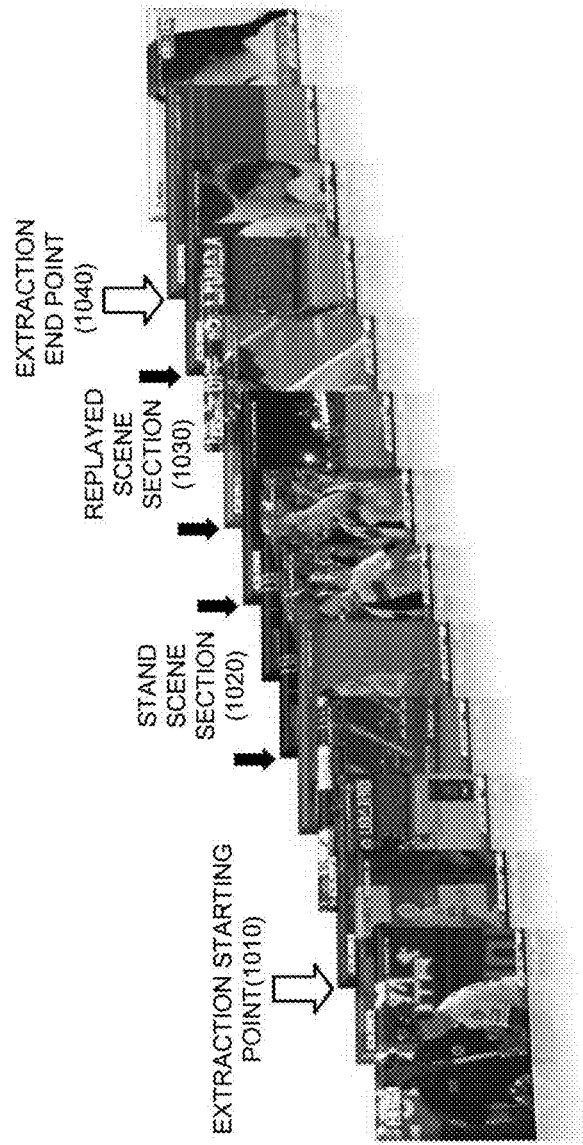
FIG. 10 is a diagram for describing processing of a created highlight video according to one embodiment.

FIG. 10 is a diagram for describing processing of a created highlight video according to one embodiment.

The highlight video created based on the frames from the starting frame of the target pitch count—1 to the last frame of the target pitch count as described above may include noise. Here, the noise refers to a frame that does not correspond to a keyword, and an apparatus for highlight extraction may remove the frame corresponding to the noise from the extracted frames using log information.

For example, in the case where a target pitch count that corresponds to Sung-Bum Na's $30^{th}$ home-run, which is a keyword, is 50 pitches, frames from the starting frame of the $49^{th}$ pitch to the last frame of the $50^{th}$ pitch may include stand, commentary, dugout, and replayed scene sections, as well as pitchers and batters. Here, the noise refers to a scene that does not correspond to the keyword (e.g., Sung-Bum Na's $30^{th}$ home-run), and may include a stand scene section and a replayed scene section. Thus, the apparatus for highlight extraction may create a highlight video by removing the frames corresponding to the noise from the frames from the starting frame of the target pitch count—1 to the last frame of the target pitch count.

For example, when among frames from the starting frame 1 of the target pitch count—1 to the last frame 30 of the target pitch count that correspond to the keyword, "Sung-Bum Na's $30^{th}$ home-run," frames 3 to 5 correspond to replay frames, frames 13 to 17 correspond to stand frames and frames 21 and 22 correspond to commentary frames, the apparatus for highlight extraction may create a highlight video corresponding to Sung-Bum Na's $30^{th}$ home-run by combining the frames, ruling out frames 3 to 5, 13 to 17, 21, and 22.

FIG. 11 is a flowchart illustrating a method for highlight extraction performed by an apparatus for highlight extraction according to one embodiment.

In operation 1110, the apparatus for highlight extraction may identify a video including a sporting event, log information that sequentially records events occurring in the sporting event, and keywords related to the video.

In operation 1120, the apparatus for highlight extraction may tag the video with game information related to the video. In this case, the apparatus for highlight extraction may tag the video with game information identified using a scoreboard. The scoreboard may be positioned at a predetermined area of the video and may include inning, score, ball count, runner status, and pitch count.

In this case, when the scoreboard is displayed in the video, the apparatus for highlight extraction may recognize the game information shown on the scoreboard and tag the game information to a corresponding frame of the video. Alternatively, when the scoreboard is not displayed in the video, the apparatus for highlight extraction may tag a corresponding frame of the video with information indicating there is no game information corresponding to the scoreboard.

The apparatus for highlight extraction may tag not only the game information but also scene information to a corresponding frame of the video. Specifically, the apparatus for highlight extraction may detect scene change and tag scene change information to the frame, or may recognize a scene according to predetermined criteria and tag scene recognition information to the frame.

In this case, the scene change may be detected by converting RGB into HSV and using a histogram difference of HSV. In addition, a histogram difference between a previous frame and a current frame for each channel of each HSV may be determined and whether or not scene change has occurred may be determined by comparing the determined histogram difference with a predetermined reference. In addition, scene recognition may be set on the basis of a criterion matching a corresponding frame among predetermined criteria set by the apparatus for highlight extraction.

In operation 1130, the apparatus for highlight extraction may extract at least one piece of log information corresponding to the keyword and determine at least one frame corresponding to the log information extracted from the tagged video.

When it is not possible to extract at least one piece of log information corresponding to the keyword from the video including the sporting event, a highlight video corresponding to the keyword cannot be generated from the video including the sporting event. For example, when home-run is input as a keyword, if there is no home-run in a baseball game, a highlight video corresponding to a home-run cannot be created for the baseball game.

Here, the at least one frame may include any frames from the starting frame of a target pitch count—1 to the last frame of the target pitch count that correspond to a situation included in the keyword. In this case, the apparatus for highlight extraction may rule out frames that do not correspond to the keyword from a range of frames from the starting frame of a target pitch count—1 to the last frame of the target pitch count.

In operation 1140, the apparatus for highlight extraction may create a highlight video by combining the at least one determined frame.

According to one embodiment, when there is one keyword, the apparatus for highlight extraction may create one highlight video that corresponds to the single keyword. For example, when the keyword is "Sung-Bum Na's $30^{th}$ home-run," the apparatus for highlight extraction may create one highlight video corresponding to Sung-Bum Na's $30^{th}$ home-run.

According to one embodiment, when there are a plurality of keywords, the apparatus for highlight extraction may create a highlight video by combining at least one highlight video that corresponds to the plurality of keywords. For example, when the keywords are "Sung-Bum Na's $1^{st}$ to $30^{th}$ home-runs" the apparatus for highlight extraction may create a highlight video by combining highlight video 1 extracted from a baseball game that corresponds to Sung-Bum Na's $1^{st}$ home-run to highlight video 30 extracted from a baseball game that corresponds to Sung-Bum Na's $30^{th}$ home-run.

The above-described exemplary embodiments may be realized in the form of a hardware component, a software component, and/or a combination of a hardware component and a software component. For example, the apparatus, method, and corresponding components according to the above-described exemplary embodiments of the present disclosure may be realized by using at least one or more universal computers or special-purpose computers, such as a processor, a controller, an arithmetic logic unit (ALU), a digital signal processor, a field programmable array (FPA), a programmable logic unit (PLU), a microprocessor, or any type of device that can execute and respond to an instruction (or command). A processing device may execute an operating system (OS) and at least one or more software application, which is executed within the operating system (OS). Additionally, the processing device may respond to the execution of a software application, so as to access, store, manipulate, process, and generate data. In order to facilitate and simplify the understanding of the present disclosure, the present disclosure may be described to include only one processing device. However, it will be apparent to anyone skilled in the art that the processing device may include a plurality of processing elements and/or may include multiple types of processing elements. For example, the processing device may include multiple processors, or the processing device may include one processor and one controller. Additionally, other processing configuration, such as a parallel processor, may be configured herein.

The software may include a computer program, a code, an instruction, or a combination of one or more of the above. And, the software may configure a processing device, so that the processing device can be operated as intended, or the software may independently or collectively instruct (or command) the processing device. In order to be interpreted by the processing device, or in order to provide an instruction or data to the processing device, the software and/or data may be permanently or temporarily embodied in any type of machine, a component, a physical equipment (or device), a virtual equipment, a computer storage medium or device, or a transmitted signal wave. Since the software is dispersed (or scattered) within a computer system being connected to a network, the software may be stored or executed by using in a dispersion method. The software and data may be stored in one or more computer-readable recording media.

The method according to the exemplary embodiment of the present disclosure may be realized in a program command (or instruction) format that may be executed by using diverse computing means, so as to be recorded in a computer-readable medium. Herein, the computer-readable medium may independently include a program command (or instruction), a data file, a data structure, and so on, or may include a combination of the same. The program command being recorded in the medium may correspond to a program command that is specifically designed and configured for the exemplary embodiments of the present disclosure, or the program command may correspond to a program command that is disclosed and available to anyone skilled in or related to computer software. Examples of the computer-readable recording medium may include magnetic media, such as hard discs, floppy discs, and magnetic tapes, optical media, such as CD-ROMs, DVDs, and so on, magneto-optical media, such as floptical discs, and hardware devices specially configured (or designed) for storing and executing program commands, such as ROMs, RAMs, flash memories, and so on. Examples of a program command may not only include machine language codes, which are created by a compiler, but may also include high-level language codes, which may be executed by a computer by using an interpreter, and so on. The above-mentioned hardware equipment may be configured to be operated as one or more software modules for executing the operations of the exemplary embodiment of the present disclosure, and vice versa.

According to the disclosed embodiments, a highlight video may be automatically created based on a video including a sporting event, log information that sequentially records events occurring in the sporting event, and a keyword related to the video. Thus, it can reduce the time and cost for creating the highlight video of the sporting event.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for highlight extraction, comprising:
identifying a video including a sporting event, log information that sequentially records events occurring in the sporting event, and a keyword related to the video;
tagging the video with game information related to the video;
extracting at least one piece of log information corresponding to the keyword and determining at least one frame that corresponds to the log information extracted from the tagged video;
creating a highlight video by combining the at least one determined frame; and
removing one or more frames corresponding to noise included in the highlight video by detecting scene change, and performing scene recognition based on deep learning according to predetermined criteria,
wherein the noise refers to a frame that does not correspond to one or more preset keywords, and
wherein the creating of the highlight video comprises, when there is a single keyword, creating one highlight video corresponding to the single keyword, and when there are a plurality of keywords, creating the highlight video by combining at least one highlight video corresponding to the plurality of keywords.

2. The method of claim 1, wherein the tagging of the video comprises, when a scoreboard is displayed in the video, recognizing game information shown in the scoreboard and tagging the game information to a corresponding frame of the video, and, when the scoreboard is not displayed in the video, tagging a corresponding frame of the video with information indicating that there is no game information that corresponds to the scoreboard, and the game information shown in the scoreboard comprises score, ball count, and inning.

3. The method of claim 2, further comprising extracting a characteristic from the scoreboard displayed in a predetermined area of the video and classifying the extracted characteristic using data learned in advance.

4. The method of claim 2, wherein when the game information shown in the scoreboard further comprises runner status, the runner status is tagged to a corresponding frame of the video and when the game information shown in the scoreboard further comprises a pitch count, the pitch count is tagged to a corresponding frame of the video.

5. The method of claim 1, wherein the tagging of the video comprises tagging scene change information to a corresponding frame of the video by detecting the scene change, and tagging scene recognition information to a corresponding frame of the video by performing the scene recognition according to the predetermined criteria.

6. The method of claim 5, wherein the scene change is detected by converting red-green-blue (RGB) into hue-saturation-value (HSV) and using a histogram difference of the HSV, wherein the histogram difference between a previous frame and a current frame for each channel of each of the HSV is determined and the scene change is determined by comparing the determined histogram difference with a predetermined reference.

7. The method of claim 5, wherein the scene recognition is set on the basis of a criterion matching a corresponding frame among predetermined criteria set by an apparatus for highlight extraction.

8. The method of claim 1, wherein the at least one frame comprises a frame from a starting frame of a target pitch count—1 to a last frame of the target pitch count that correspond to a situation included in the keyword.

9. The method of claim 1, further comprising ruling out a frame that does not correspond to the keyword from frames from a starting frame of a target pitch count—1 to a last frame of the target pitch count.

10. An apparatus for highlight extraction, comprising:
a processor; and
a memory including a computer-readable command,
wherein the processor is configured to, when the computer-readable command is executed in the processor,
identify a video including a sporting event, log information that sequentially records events occurring in the sporting event, and a keyword related to the video,
tag the video with game information related to the video,
extract at least one piece of log information corresponding to the keyword and determine at least one frame that corresponds to the log information extracted from the tagged video,
create a highlight video by combining the at least one determined frame, and
remove one or more frames corresponding to noise included in the highlight video by detecting scene change, and performing scene recognition based on deep learning according to predetermined criteria,
wherein the noise refers to a frame that does not correspond to one or more preset keywords, and
wherein the processor is further configured to, when there is a single keyword, create one highlight video corresponding to the single keyword, and, when there are a plurality of keywords, create the highlight video by combining at least one highlight video corresponding to the plurality of keywords.

11. The apparatus of claim 10, wherein the processor is further configured to, when a scoreboard is displayed in the video, recognize game information shown in the scoreboard and tag the game information to a corresponding frame of the video, and, when the scoreboard is not displayed in the video, tag a corresponding frame of the video with information indicating that there is no game information that corresponds to the scoreboard, and the game information shown in the scoreboard comprises score, ball count, and inning.

12. The apparatus of claim 11, wherein the processor is further configured to extract a characteristic from the scoreboard displayed in a predetermined area of the video and classify the extracted characteristic using data learned in advance.

13. The apparatus of claim 11, wherein the processor is further configured to, when the game information shown in the scoreboard further comprises runner status, tag the runner status to a corresponding frame of the video, and, when the game information shown in the scoreboard further comprises a pitch count, tag the pitch count to a corresponding frame of the video.

14. The apparatus of claim 10, wherein the processor is further configured to tag scene change information to a corresponding frame of the video by detecting the scene change and tag scene recognition information to a corresponding frame of the video by performing the scene recognition according to the predetermined criteria.

15. The apparatus of claim 14, wherein the processor is further configured to detect the scene change by converting red-green-blue (RGB) into hue-saturation-value (HSV) and using a histogram difference of the HSV, wherein the histogram difference between a previous frame and a current frame for each channel of each of the HSV is determined and the scene change is determined by comparing the determined histogram difference with a predetermined reference.

16. The apparatus of claim 14, wherein the scene recognition is set on the basis of a criterion matching a corresponding frame among predetermined criteria set by the apparatus for highlight extraction.

17. The apparatus of claim 10, wherein the at least one frame comprises a frame from a starting frame of a target pitch count—1 to a last frame of the target pitch count that correspond to a situation included in the keyword.

18. The apparatus of claim 10, wherein the processor is further configured to rule out a frame that does not correspond to the keyword from frames from a starting frame of a target pitch count—1 to a last frame of the target pitch count.

* * * * *